(12) United States Patent
Brewer et al.

(10) Patent No.: US 8,280,873 B1
(45) Date of Patent: Oct. 2, 2012

(54) SYSTEM FOR CAPTURING A BUSINESS CONTEXT OF A USER'S INTERACTION WITH A WEBSITE AND METHOD FOR THE SAME

(75) Inventors: Thomas G. Brewer, Lexington, SC (US); James L. Browning, Columbia, SC (US)

(73) Assignee: Teradata US, Inc., Dayton, OH (US)

( * ) Notice: Subject to any disclaimer, the term of this patent is extended or adjusted under 35 U.S.C. 154(b) by 3236 days.

(21) Appl. No.: 10/124,097

(22) Filed: Apr. 17, 2002

(51) Int. Cl.
G06F 17/30 (2006.01)
G06F 17/00 (2006.01)

(52) U.S. Cl. .................... 707/709; 707/602; 707/802

(58) Field of Classification Search .............. 707/1–5, 707/100–104.1, 602, 672, 709, 769, 802–805; 709/218–225; 706/45–50; 345/968; 725/60–61
See application file for complete search history.

(56) References Cited

U.S. PATENT DOCUMENTS

| | | | |
|---|---|---|---|
| 5,835,712 A | 11/1998 | DuFresne | |
| 5,970,480 A * | 10/1999 | Kalina | 705/37 |
| 6,014,698 A | 1/2000 | Griffiths | |
| 6,052,730 A * | 4/2000 | Felciano et al. | 709/225 |
| 6,076,108 A * | 6/2000 | Courts et al. | 709/227 |
| 6,128,624 A | 10/2000 | Papierniak et al. | |
| 6,141,666 A | 10/2000 | Tobin | |
| 6,151,584 A | 11/2000 | Papierniak et al. | |
| 6,151,601 A | 11/2000 | Papierniak et al. | |
| 6,177,932 B1 * | 1/2001 | Galdes et al. | 715/733 |
| 6,249,291 B1 * | 6/2001 | Popp et al. | 345/473 |
| 6,317,787 B1 * | 11/2001 | Boyd et al. | 709/224 |
| 6,480,894 B1 * | 11/2002 | Courts et al. | 709/227 |
| 6,681,247 B1 * | 1/2004 | Payton | 709/217 |
| 6,684,206 B2 * | 1/2004 | Chen et al. | 707/3 |
| 6,751,612 B1 * | 6/2004 | Schuetze et al. | 707/4 |
| 2002/0026296 A1 * | 2/2002 | Lohmann et al. | 703/1 |
| 2002/0077930 A1 * | 6/2002 | Trubey et al. | 705/26 |
| 2002/0083129 A1 * | 6/2002 | Yamade et al. | 709/203 |
| 2002/0173973 A1 * | 11/2002 | Cirinna et al. | 705/1 |
| 2002/0184570 A1 * | 12/2002 | Etgen | 714/42 |
| 2003/0023715 A1 * | 1/2003 | Reiner et al. | 709/224 |
| 2003/0135487 A1 * | 7/2003 | Beyer et al. | 707/3 |

FOREIGN PATENT DOCUMENTS

WO    WO 98/38614    *    9/1998

(Continued)

OTHER PUBLICATIONS

Peter Pirolli et al. "A user-tracking architecture for modeling interaction with the world wide web"10 pages.*

(Continued)

*Primary Examiner* — Srirama Channavajjala
(74) *Attorney, Agent, or Firm* — James Stover

(57) ABSTRACT

The present invention relates to a system for capturing a business context of a user's interaction with a website. The system has a web server containing web pages and a web log. A web log filter extracts data from the web log associated with the address associated with the business context. A data analysis creation tool is in communication with a shared configuration table in the enterprise data warehouse, wherein the data analysis creation tool has executable instructions for creating a logical data model for mapping the extracted data to the enterprise data warehouse. A method for the same is also provided.

7 Claims, 8 Drawing Sheets

FOREIGN PATENT DOCUMENTS

| WO | WO 01/15037 A2 | * | 3/2004 |
| WO | WO 2004/025403 A2 | * | 3/2004 |
| WO | WO 01/63448 | * | 8/2004 |

OTHER PUBLICATIONS

Jeffrey Heer, "Capturing and analyzing the web experience", 5 pages.*

Robert W reeder et al. "Webeyemapper and weblogger: tools for analyzing eye tracking daa collected in web-use studies", In Proc. of the ACM conference on Human factors in computing systems, CH1, 2001.*

Alex G Biichner et al. "Discovering internet marketing intellgence through online analytical web usage mining", SIGMOD record vol. 27, No. 4, Dec. 1998, pp. 54-61.*

Xiaohua Hu et al. A data warehouse/OLAP framework for web usage mining and business intellgence reporting, pp. 1-21.*

Feng Tao et al. "Towards knowledge discovery from WWW log data", Information technology: coding and computing, proceedings, international conference, Mar. 2000, pp. 302-307.*

Liu Jian-quo et al. "web mining for electronic business application", Parallel and distributed computing, applications technologies, 2003. PDCAT 2003, proceedings of the fourth international conference, Aug. 2003, pp. 872-876.*

Demiriz,A, "webSPADE: a parallel sequence mining algorithm to analyze web log data",Data mining, 2002. Proceedings, 2002 international conference: Dec. 2002, pp. 755-758.* net.Analysis: An architecture for acquiring E-business intelligence, 1998pp. 1-21.*

* cited by examiner

SYSTEM FOR CAPTURING A BUSINESS CONTEXT OF A USER'S INTERACTION WITH A WEBSITE AND METHOD FOR THE SAME

The present invention relates to a data capturing system and method, and more particularly to a system and method of capturing business context data in real-time or in batch from a user's interaction with a website.

BACKGROUND OF THE INVENTION

The Internet has proliferated many new opportunities for companies selling products and services such as providing them the opportunity to expand their market presence all over the world. This presence has allowed many of these companies to not only increase revenue growth, but also to expand product lines and services offered to on-line consumers. Due to the increases in demand many of these companies have experienced, they typically devote a significant amount of resources to attract new and existing consumers to their on-line websites.

Nonetheless, in light of the successes many companies have experienced with their on-line offerings, few have the data that identifies which consumers are most apt to not only visit their website, but also purchase and repurchase products and services. This lack of data leaves companies feeling helpless with respect to effectively allocating resources to attract new and existing consumers to their on-line website. Accordingly, it is becoming increasingly common for companies that provide on-line services to capture and analyze on-line data to enhance the effectiveness of resources utilized to attract new and existing consumers to their on-line websites.

In more detail, on-line data may be derived from many sources such as web logs maintained by a web server or even data collected from a user's current interaction with a website. Many companies would find it advantageous to enable the consistent and timely capture and storage of such on-line data in a data warehouse. More particularly, the data could be analyzed by a company and used to make critical business decisions regarding its on-line business strategy based on consumer activity related to the website. Typically, the data that is collected in web logs has a relationship to the higher hierarchical organization of the website itself. The site context is ever changing and information about its previous state is almost never preserved. Because the site context is not persistent and the web log data is directly dependent upon that context, the data semantics are not persistent either. Many questions cannot be answered by web log data in the absence of site context.

Additionally, many companies might also find it advantageous to collect such data representing current user activity in real time or near time. Such real time data may allow a business entity to provide enhanced personalization of content to consumers and communication with its website. Accordingly, the present invention seeks to address the above issues and provide a system and method for capturing business context data from any variety of web sources in real time or in batch.

SUMMARY OF THE INVENTION

One embodiment of the present invention is a system for mapping a user's interaction with a web page to capture desired business context interaction data. The system comprises: a web server comprising web pages and a web log, wherein the web log tracks a user's request for desired web pages; a table comprising one or more business contexts, wherein the business context is related to a user's interaction with the web page, and further wherein the business context contains one or more attributes; and a context mapping tool in communication with the web server and the table, wherein the context mapping tool comprises executable instructions configured to view web pages on the web server and allow selection of the desired web page to associate with the business context, and further wherein an address for the desired web page is added as an attribute of the business context in table.

Another embodiment of the present invention is a system for extracting a user's interaction with a web page to capture desired business context interaction data. The system comprises: a web log filter in communication with a web log and a table comprising one or more business contexts, wherein the web log filter comprises executable instructions to extract data from the web log associated with an address associated with the business context; and a data analyst creation tool in communication with the table and an enterprise data warehouse, wherein the data analyst creation tool comprises executable instructions for creating a logical data model for mapping the extracted data to the enterprise data warehouse.

Yet another embodiment of the present invention is a system for tagging a web page to capture desired business context interaction data relating to a user's interaction with a web site. The system comprises: a web server comprising web pages and a web log, wherein the web log tracks a user's request for desired web pages; a context logging server, wherein the context logging server comprises tag items and a context log, wherein the context log tracks a web page's request for a tagged item; a table comprising one or more business contexts, wherein the business context is related to a user's interaction with the web page, and further wherein the business context contains one or more attributes; and a context tagging tool in communication with the web server, context logging server and the table, wherein the context tagging tool comprises executable instructions configured to alter web pages on the web server and insert a tag to the context logging server, wherein the tag comprises data associated with a business context.

Another embodiment of the present invention is a system for extracting tagged business context interaction data relating to a user's interaction with a web site. The system comprises: a context logging filter in communication with a context log and a table comprising one or more business contexts, wherein the context log filter comprises executable instructions to extract data from the context log associated with the business context; a data analyst creation tool in communication with the table and an enterprise data warehouse, wherein the data analyst creation tool comprises executable instructions for creating a logical data model for mapping the extracted data to the enterprise data warehouse.

One embodiment of the present invention is a method for mapping a user's interaction with a web page to capture desired business context interaction data. The method comprises: browsing a website utilizing a context mapping tool, wherein the context mapping tool comprises a user interface to identify web pages of interest for the user's interaction; selecting through the context mapping tool a desired web page of interest, wherein the desired web page of interest has an address; associating the desired web page address with a business context stored in a table by creating an entry in the table containing the business context attributes, wherein one of the attributes comprises the web page address; creating proper structure in a enterprise data warehouse, wherein the structure comprises the business context and associated attributes; extracting data from a web log, wherein the extracted data is associated with the web page address stored in the table; and copying the extracted data to the enterprise data warehouse.

Another embodiment of the present invention is a method for mapping a user's interaction with a web page to capture desired business context interaction data. The method comprises: creating a business context utilizing a business context tool, wherein the business context is related to the user's interaction with a web page, and further wherein the business context contains one or more attributes; storing one or more created business contexts in a table. browsing a website utilizing a context mapping tool, wherein the context mapping tool comprises a user interface to identify web pages of interest for the user's interaction; selecting through the context mapping tool a desired web page of interest, wherein the desired web page of interest has an address; associating the desired web page address with one of the business context stored in the table by creating an entry in the table containing the business context attributes, wherein one of the attributes comprises the web page address; creating proper structure in a enterprise data warehouse, wherein the structure comprises the business context and associated attributes; extracting data from the web log, wherein the extracted data is associated with the web page address stored in the table; and copying the extracted data to the enterprise data warehouse.

Yet another method of the present invention is a method for tagging a web page to capture desired business context interaction data relating to a user's interaction with a web site. The method comprises: connecting to a web server and browsing a web page utilizing a context tagging tool, wherein the context tagging tool comprises a user interface to identify web pages of interest for the user's interaction; selecting through the context tagging tool a desired web page of interest; associating the desired web page with a business context by inserting a tag into the web page, wherein the tag comprises a request to the context logging server; creating proper structure in an enterprise data warehouse utilizing a data context tool, wherein the structure comprises the business context and associated attributes; extracting data from a context log of a context logging server utilizing a context log filter, wherein the extracted data contains the business context attributes; and copying the extracted data to the enterprise data warehouse.

Yet still another embodiment of the present invention comprises a method for mapping a user's interaction with a web page to capture desired business context interaction data. The method comprises: creating a business context, wherein the business context is related to a user's interaction with a web page, wherein the business context contain one or more attributes; storing the created business context in a table; browsing a website utilizing a user interface to identify web pages of interest for user's interaction; selecting through the user interface a desired web page of interest, wherein the desired web page has an address; associating the business context with the desired web page address by creating an entry in the table containing the business context attributes, wherein one of the attributes comprises the web page address; creating structure in a data warehouse for business context; extracting data from a web log, wherein the data is associated with the web page address stored in the shared configuration table; copying one or more business context data attributes from the extracted data to the data warehouse.

Another embodiment of the present invention comprises a method for capturing in near time to an enterprise data warehouse a user's interaction with a web page. The method comprises: creating one or more business context related to a user's interaction with a web page, wherein the business contexts contain one or more attributes; storing the created business context in a table; browsing a website utilizing a user interface to identify web pages of interest for user's interaction; selecting through the user interface a desired web page of interest; modifying the desired web page with a business context tag, wherein the business context tag comprises a referrer to a context logging server; creating structure in a data warehouse for business context; creating a web log on the context logging server when the referrer is received by the context logging server; and copying one or more business context data attributes from the content logging server web log to the data warehouse.

Yet another embodiment of the present invention is computer-readable medium having encoded thereon a method for controlling a computer system for capturing a business context of a user's interaction with a website. The method encoded on the computer-readable medium comprises: selecting desired web pages of interest; obtaining the address of the desired web page; associating the desired web page address with a business context stored in a shared configuration table; creating proper structure in a data warehouse; extracting data from a web log corresponding to the desired web page URL address; copying the extracted data to the data warehouse.

Still other objects, advantages and novel features of the present invention will become apparent to those skilled in the art from the following detailed description, which is simply, by way of illustration, various modes contemplated for carrying out the invention. As will be realized, the invention is capable of other different aspects all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

DETAILED DESCRIPTION OF ILLUSTRATIVE EMBODIMENTS

Reference will now be made in detail to various embodiments of the invention, various examples of which are illustrated in the accompanying drawings, wherein like numerals indicate corresponding elements throughout the views.

Figure 1:
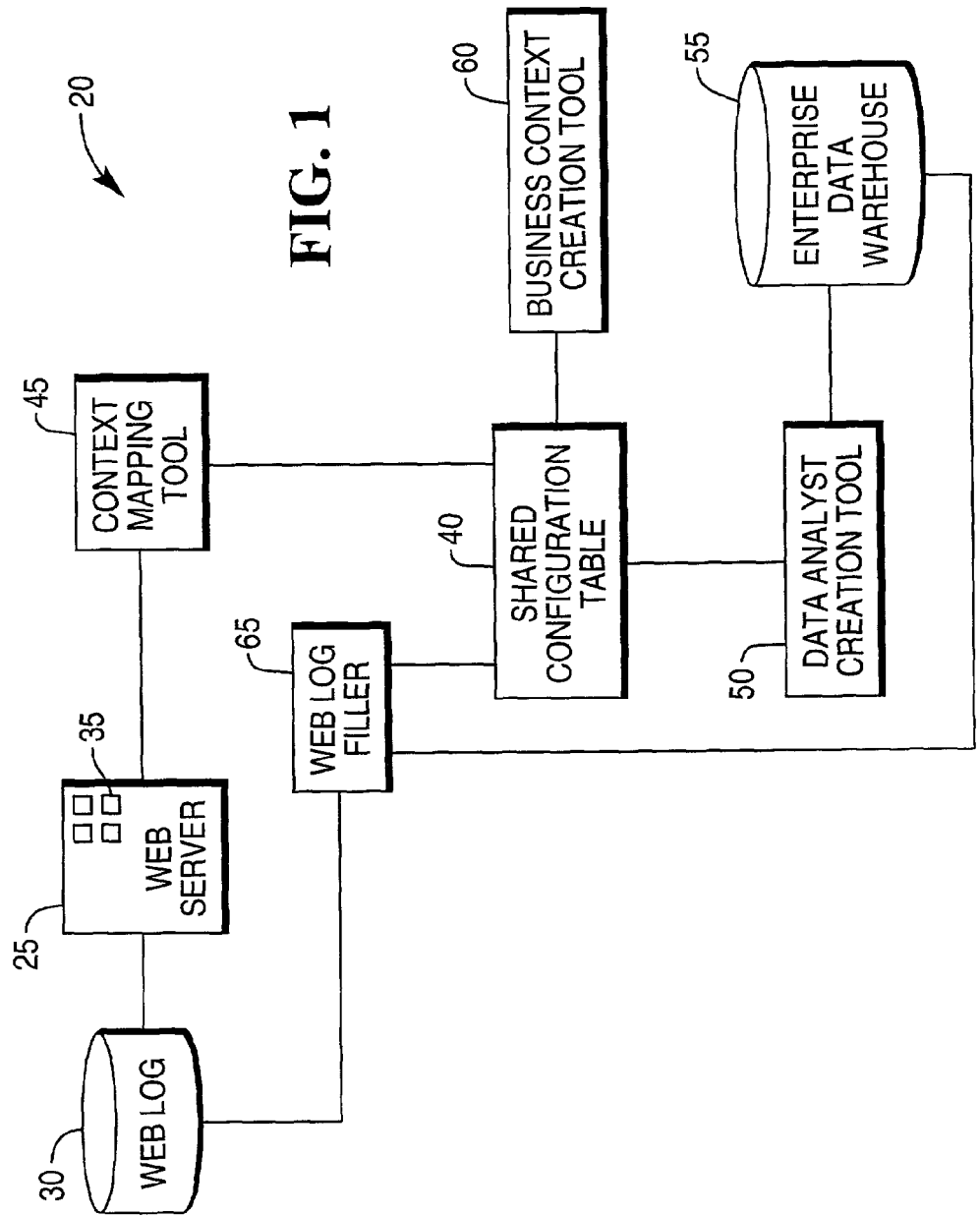
FIG. 1 depicts an illustrative business context mapping system in accordance with the present invention.

FIG. 1 depicts an illustrative system 20 for mapping a user's interaction with a web page 35 to capture a desired business context data. The business context mapping system 20 comprises a web server 25 which comprises web pages 35 and a web log 30. The web log tracks a user's request for desired web pages 35. A shared configuration table 40 comprises one or more business context, wherein the business context is related to a user's interaction with a web page 35. A business context comprises one or more attributes. Illustrative attributes typically include a unique identifier, a business context label, a user readable description, web page syntax, table and reference from the enterprise data warehouse, and a staging table column information. A context mapping tool 45 is in communication with the web server 25 and a shared configuration table 40. The context mapping tool 45 comprises executable instructions configured to view web pages 35 stored on the web server 25 and allow selection of the desired web page 35 to associate with the business context. The context mapping tool copies the URL address for the desired web page and adds it as an attribute to the business context in the shared configuration table. After a user has interacted with the web server 25, a web log filter 65 examines the web log 30 of the web server 25. The web log filter 65 comprises executable instructions to extract data from the web log 30 associated with the URL address associated with the business context and stored in the shared configuration table 40. After associating the desired web page 35 with the business context, the data analyst creation tool 50 is utilized for creating a logical data model to allow mapping of the extracted data to the enterprise data warehouse. The data analyst creation tool 50 is in communication with the shared configuration table and the enterprise data warehouse and comprises executable instructions for creating a logical data model for mapping the extracted data to the enterprise data warehouse.

In one illustrative embodiment, the business context mapping system 20 further comprises a business context creation tool 60 in communication with the shared configuration table 40. The business context creation tool 60 may comprise executable instructions to create one or more business contexts relating to a user's interaction with the web page.

In another embodiment, the context mapping tool 45 comprises the features and functionality of the business context creating tool 60. As will be realized by one skilled in the art, various components of the present invention may be combined or separated into individual components.

In one illustrative embodiment, a business analyst uses the context mapping tool 45 to enter information about the business context that are of interest and are useful in answering business questions. Examples would be "entered web session", "viewed a product", "entered a complaint", etc. A label for each context and a detailed description of the business context are entered into the context mapping tool as well. The business analyst uses the context mapping tool to browse a website. When the business analyst identifies a page where one or more of the business contexts are represented, the list of context labels is used to select and associate a context with the page. In one embodiment of the present invention, the context mapping tool further comprises a screen capture and notes capability. The screen capture capability allows the business analyst to capture the page and highlight the portion of the screen that relates to the business context, and attach notes to say what context is to be associated with that highlighted portion. The notes could be stored in the data analyst tool data space for later review by a data analyst. The data analyst views the HTML source to grab the specific syntax to be identified with the business context.

In one illustrative embodiment, the data analyst views the data warehouse metadata and data warehouse data model to ascertain the appropriate table and column for the context data to be loaded. In a further illustrative embodiment, a staging table is also identified. The web log data is transformed into specific business context data using the associations established by the business and data analysts and is staged in the appropriate staging table.

Figure 2:
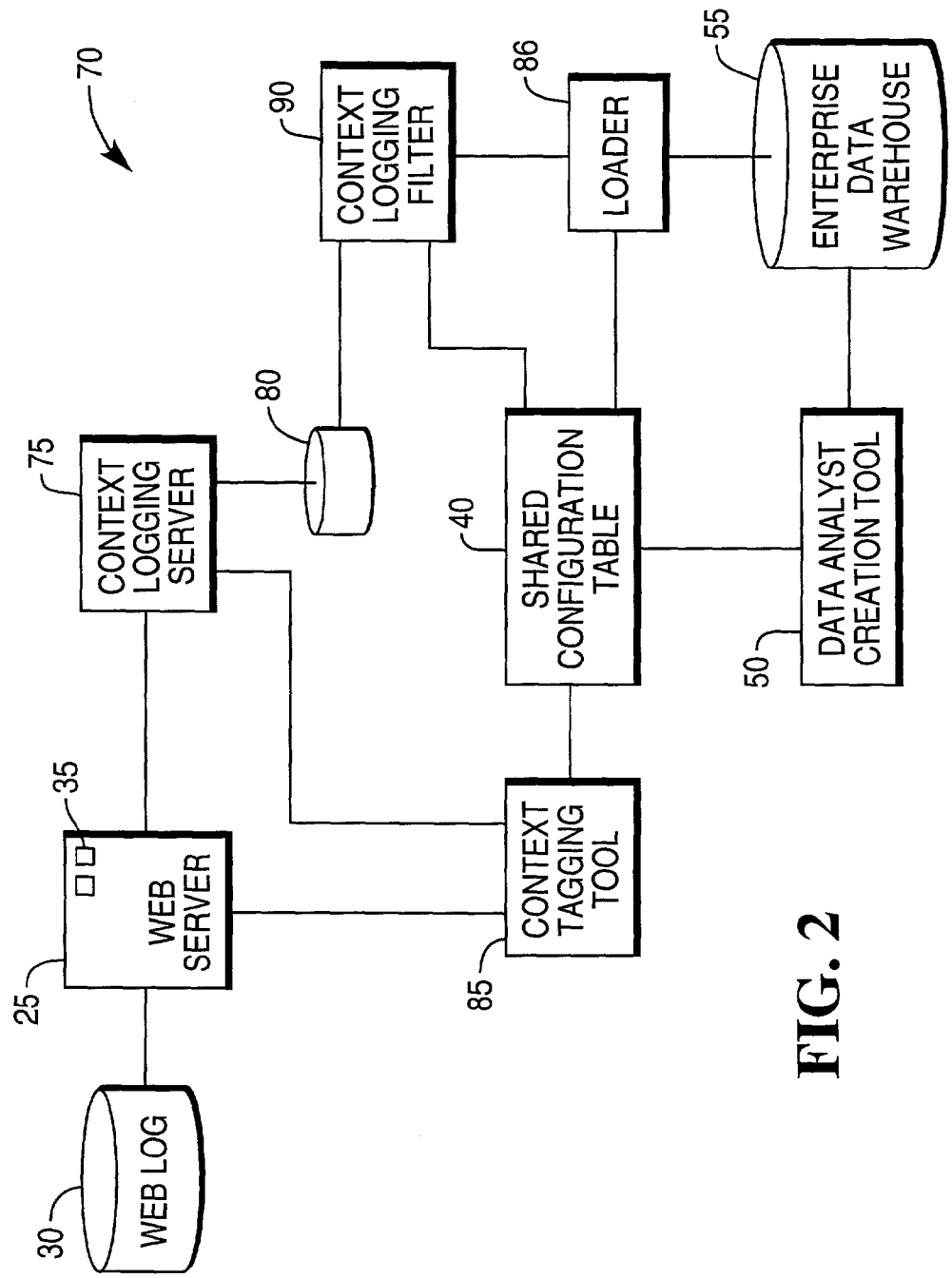
FIG. 2 depicts an illustrative business context tagging system in accordance with one embodiment of the present invention.

FIG. 2 depicts an illustrative embodiment of a business context tagging system 70 configured in accordance with the present invention. The business context tagging system 70 utilizes similar components as the business context mapping system 20. However, the business context mapping system 70 alters the desired web page code by inserting a tag into the HTML code to be able to track when the user interacts with the web page for the desired business context interaction data. The business context tagging system 70 comprises a web server 25 which comprises web pages 35 and a web log 30. The web log 30 tracks a user's request for desired web pages 35. The system further comprises a context logging server 75 in communication with the web server 25. The context logging server 75 comprises tagged items and a context log, wherein the context log 80 tracks a web page's request for a tagged item. An illustrative tagged item may be a one pixel blank image, which can be quickly loaded by the context logging server. By having the web page request the tagged image from the context logging server, the web page request can be comprised of one or more attributes of the business context in the actual request. An illustrative syntax for a tagged item is as follows:

<IMG SRC="http://contextlogserver.domain.com/context.gif?type=context label=value">

The tag syntax that is stored will insert the domain name of the context logging server in the area that reads "contextlogserver.domain.com" and the business context label will be inserted in the area that reads "contextlabel." The area that reads "value" will be modified during the actual web page tagging process. All context tags will issue http requests to a context logging server DNS name for an image to be returned. The single image that is returned is "context.gif", typically a single pixel image. This is the only content that is available from the web services of the context logging server. Thus, the context server log stores each of the http requests that contain the various business context attributes. This data can be later extracted and copied into the data warehouse where it becomes available to the entire decision support system of the enterprise.

The system further comprises a shared configuration table 40 comprising one or more business contexts, wherein the business context is related to a user's interaction with the web page. A context tagging tool 85 is in communication with the web server 25, the context logging server 75 and the shared configuration table 40. The context tagging tool 85 comprises executable instructions configured to alter web pages on the web server 25 and insert a tag which requests data from the context logging server. The context logging filter 90 comprises executable instructions to extract data from the context log 80 associated with the business context. In a further embodiment of the present invention, a loader 86 is in communication with the context logging filter 90 and the enterprise data warehouse 55. A data analysis creation tool 50 is utilized to map the context to specific tables and columns in the enterprise data warehouse. In one illustrative embodiment, the data analyst views the data warehouse metadata and data warehouse data model through the data analysis creation tool 50 to ascertain the appropriate table and column where the context data is to be loaded by the loader 86 on the enterprise data warehouse. In an alternative embodiment, the data analysis creation tool 50 features are included on the context tagging tool 85. As will be realized by one skilled in the art, various components of the invention may be combined or separated into individual components.

Typically companies may host one or more websites through a variety of host web servers including a Microsoft commerce server, Microsoft Internet Information server, an Apache server, Netscape server and many others. In these circumstances, the host web server is typically configured to provide worldwide web services such as serving up web pages or providing e-commerce function to consumers in communication with the web server. In an illustrative embodiment of the invention, the host web server may comprise a multi-CPU Microsoft Windows NT/2000 server. Moreover, in the illustrative embodiment, the web server may be configured with a Microsoft Windows NT/2000 operating system environment.

Consumers on the other hand, typically browse the Internet using a web browser in communication with the server and communication with the Internet. Once the consumer is linked to the web server 25 providing an on-line website 35, the web server 25 may not only create a web log relating to the user's activity with respect to the user's website, but the web server 25 may also be configured to communicate with the consumer's web browser.

Figure 3:
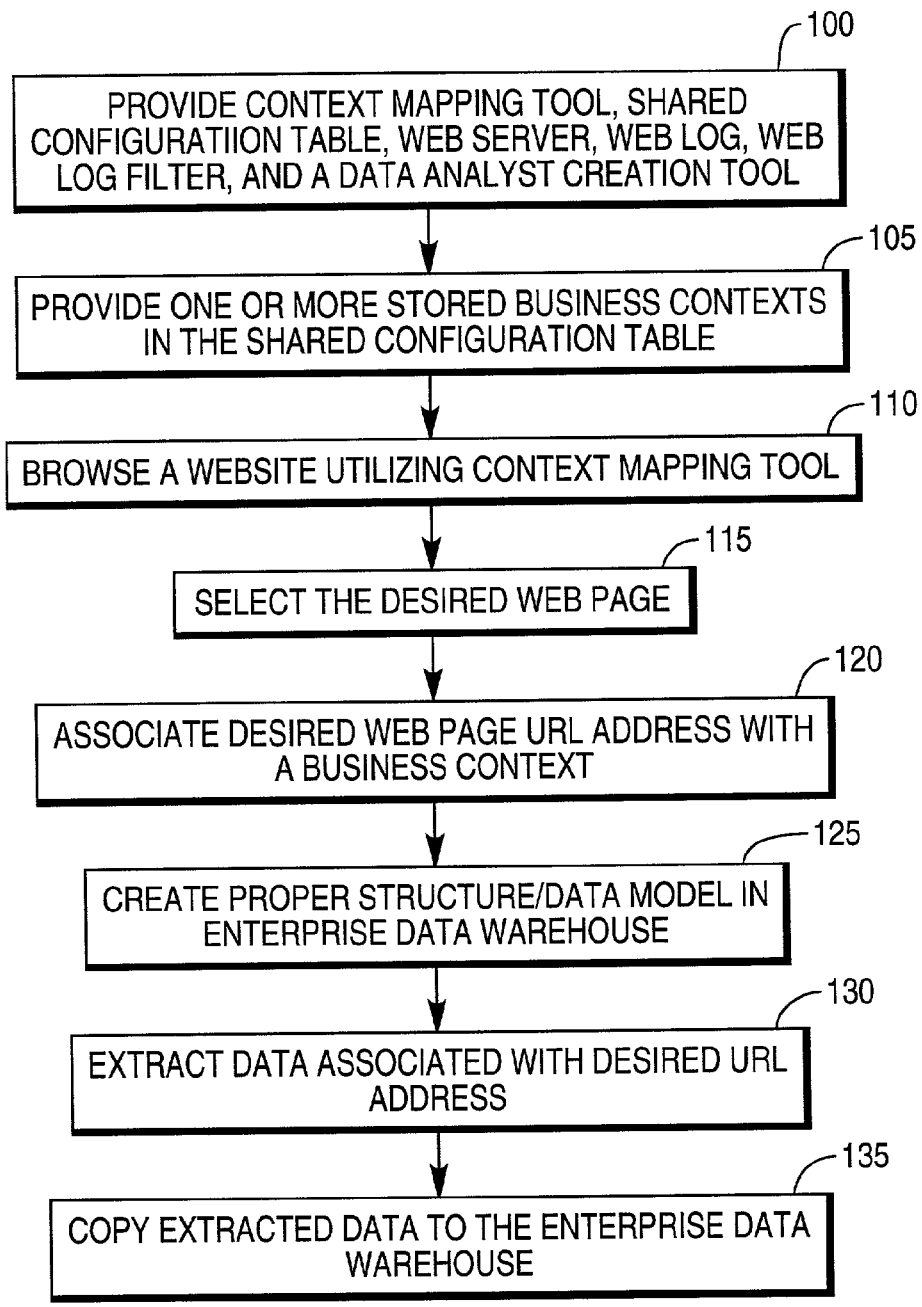
FIG. 3 depicts an illustrative flowchart of the business context mapping method in accordance with another embodiment of the present invention.

Another embodiment of the present invention is a method for mapping a user's interaction with a web page to capture desired business context interaction data. The method, depicted in the illustrative flowchart in FIG. 3, comprises the steps of: providing a context mapping tool, a shared configuration table, a web server, a web log, a web log filter, and a data analyst creation tool (step 100); providing one or more stored business context in a shared configuration table, wherein the business context contains one or more attributes (step 105); browsing a web site utilizing the context mapping tool, wherein the context mapping tool comprises a user interface to identify web pages of interest for the user's interaction (step 110); selecting through the context mapping tool, a desired web page of interest, wherein the desired web page of interest has a URL address (step 115); associating the desired web page URL address with a business context stored in the table by updating the stored business context in the shared configuration table by adding the web page URL address (step 120); creating proper structure in an enterprise data warehouse, wherein the structure comprises the business context and associated attributes (step 125); extracting data from the web log, wherein the extracted data is associated with the web page URL address stored in the shared configuration table (step 130); and copying the extracted data to the enterprise data warehouse (step 135).

Figure 4:
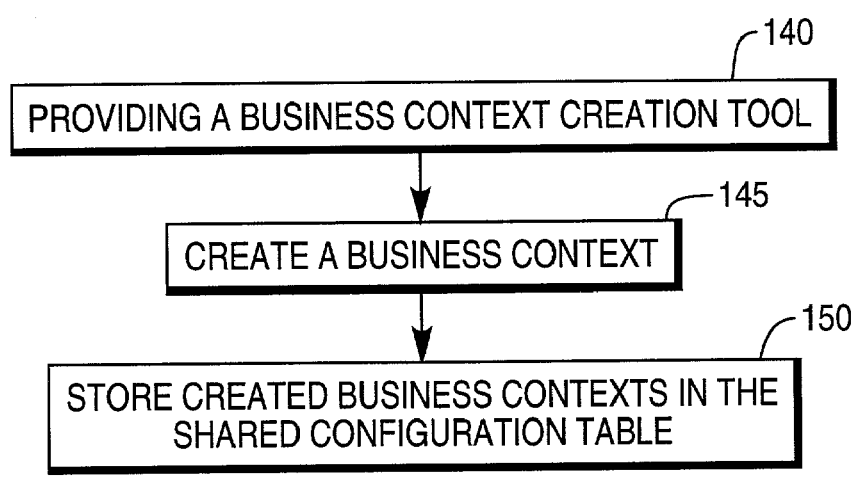
FIG. 4 depicts an illustrative flowchart of a business context mapping system in accordance with another embodiment of the present invention.

In another embodiment of the present invention, as depicted in FIG. 4, the method further comprises the steps of providing a business context creation tool (step 140); and creating a business context utilizing the business context creation tool, wherein the business context is related to the user's interaction with the web page (step 145); and storing the created business context in the shared configuration table (step 150).

Figure 5:
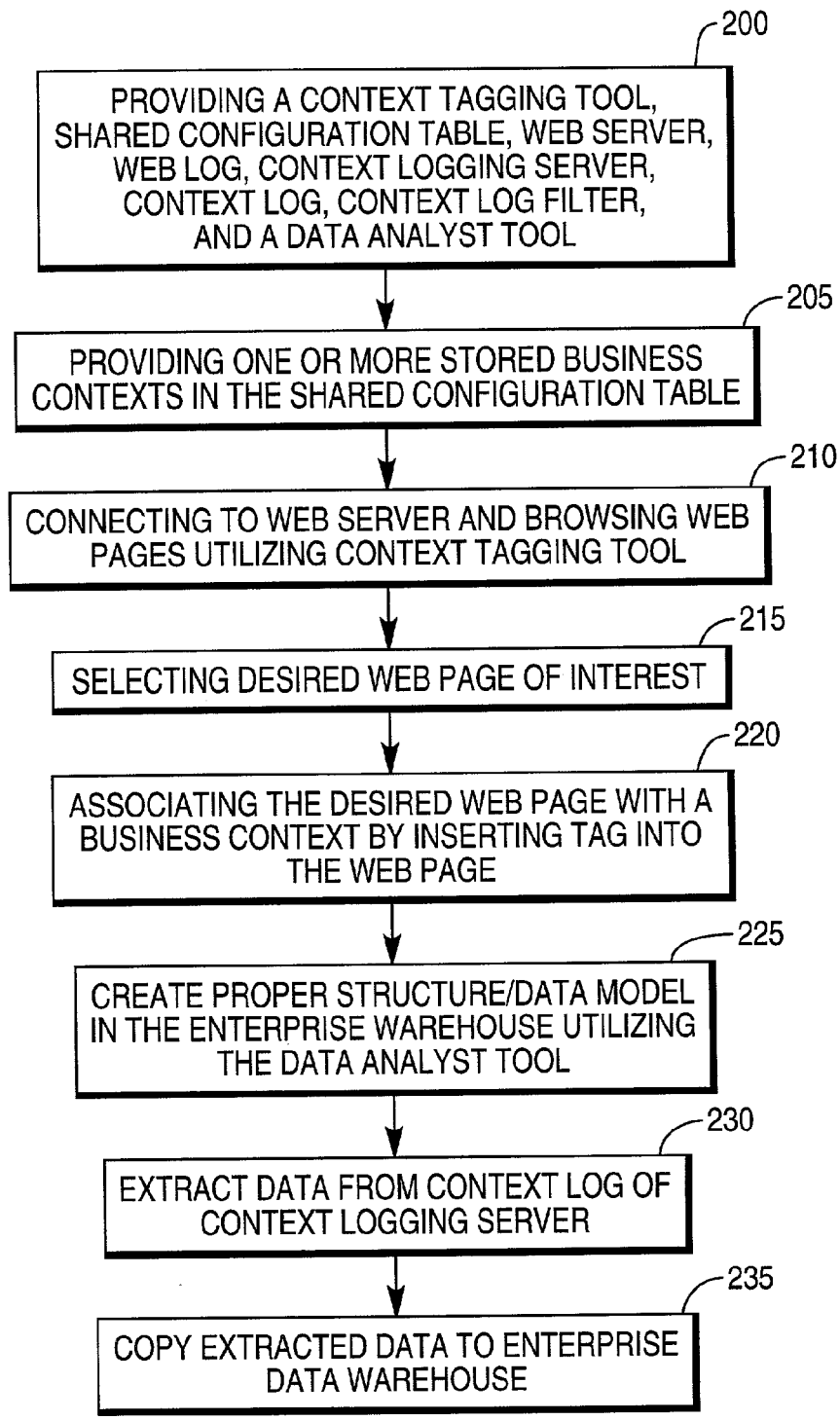
FIG. 5 depicts a illustrative data flowchart of a method of business context tagging in accordance with yet another embodiment of the present invention.

Another embodiment of the present invention is depicted in FIG. 5. FIG. 5 depicts a method for tagging a web page to capture desired business context interaction data relating to a user's interaction with a website. The method comprises the steps of: providing a context tagging tool, a shared configuration table, a web server, a web log, a context logging server, a context log, a context log filter, and a data analyst tool (step 200); providing one or more stored business context in the shared configuration table, wherein the business context contains one or more attributes (step 205); connecting to a web server and browsing a web page utilizing the context tagging tool, wherein the context tagging tool comprises a user interface to identify web pages of interest for the user's interaction (step 210); selecting through the context tagging tool a desired web page of interest (step 215); associating the desired web page with a business context by inserting a tag into the web page, wherein the tag comprises a request to the context logging server (step 220); creating proper structure in the enterprise data warehouse utilizing the data analyst tool, wherein the structure comprises the business context and associated attributes (step 225); extracting data from the context log of the context logging server utilizing the context log filter, wherein the extracted data contains the business context attributes (step 230); and copying the extracted data to the enterprise data warehouse (step 235).

In another embodiment of the invention, the method further comprises the steps of providing a business context creation tool; and creating a business context utilizing the business creation tool, wherein the business context is related to the user's interaction with a web page. In yet another embodiment, the method further comprises the steps of storing one or more created business contexts in the shared configuration file.

In an illustrative embodiment, the business analyst uses the context tagging tool 85 to browse the e-business website. At each page, the analyst decides whether to apply any business context to the web page. By right clicking the mouse, a drop-down list of defined business context is displayed. The analyst selects the appropriate context from the list and is then prompted to enter the value that is to be saved for the context. For example, if the "view product" context is selected, the value that is entered could be the SKU (or product ID) of the product. The value entered is merged into the tag syntax in the area that says value. The entire tag syntax is introduced into the HTML source for the page immediately before the </HTML> closing tag. If other contexts are applicable to the page, separate tags are entered through the tool.

In a further embodiment of the present invention, a select group of predefined tags are available for collecting user identification through cookies and capturing the referring URL at entry points to the website. These tags work in conjunction with the web server filter to capture this information into the context data base through the context logging server. A web log filter looks for specific tag data for the predefined tags and issues HTTP requests to the context logging server to log the captured information. All context tags will issue HTTP requests to a context logging server DNS name for an image to be returned. Typically, the single image that is returned is context.gif, a single pixel image. In one embodiment this is the only content that is available from the web services of the context logging server. In a further embodiment, the context logging server will have a context log filter which allows the image to be returned quickly to the user to reduce bottlenecking, but allows continued parsing and structuring of the context data passed in the tag and writing it to the context database.

Another embodiment of the present invention is a method for mapping a user's interaction with a web page to capture desired business context interaction data. The method comprises the steps of: providing a business context creation tool, shared configuration tables, web server, web log, web log filter and a data context analyst; creating a business context utilizing the business context creation tool, wherein the business context is related to a user's interaction with a web page, wherein the business context contains one or more attributes; storing the created business context in a shared configuration table; browsing a website using a user interface to identify web pages of interest for user's interaction; selecting through the user interface a desired web page of interest, wherein the desired web page has a URL address; associating the business context with the desired web page URL address by creating an entry in the shared configuration table containing the business context attributes, wherein one of the attributes comprises the web page URL address; creating structure in a data warehouse for business context, extracting data from a web log, wherein the data is associated with the web page URL address stored in the shared configuration table; copying one or more business context data attributes from the extracted data to the enterprise data warehouse.

Figure 6:
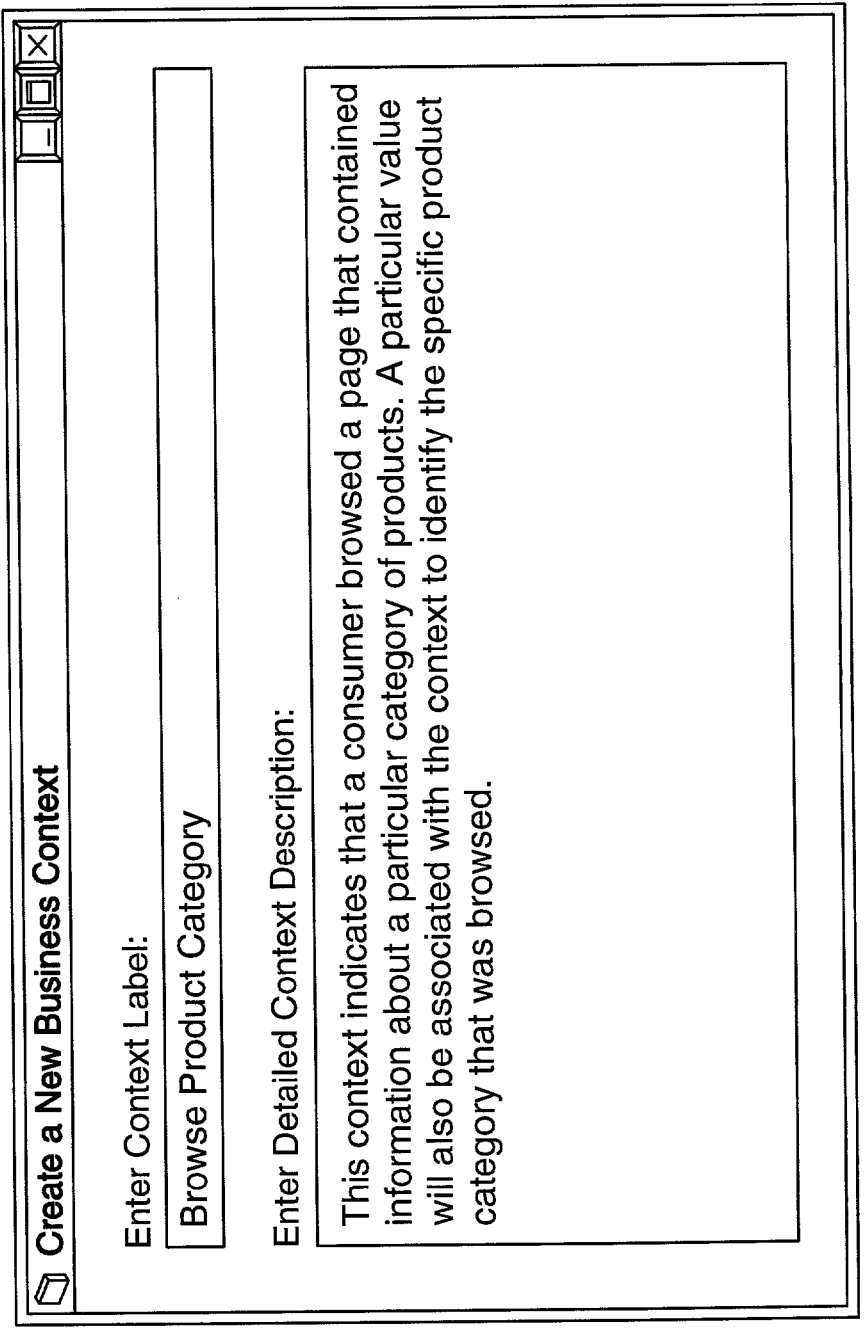
FIG. 6 depicts an illustrative graphical user interface of the present invention.

In one illustrative embodiment, depicted in FIG. 6, the business analyst creating tool is a browser based, graphical user interface that allows a business analyst to define and modify a set of business context; browse and automatically associate a business context to HTML pages; and review and modify context after website changes. An illustrative business context definition has four visible parts: a descriptive label, a detailed text description, a value type and the URL for the context logging server that will log context of this type. Additionally, a globally unique identifier (GUID) will be generated by the system for each new business context defined. The GUID will insure persistence in the data collected, even when minor changes are made over time and the visible components.

Figure 7:
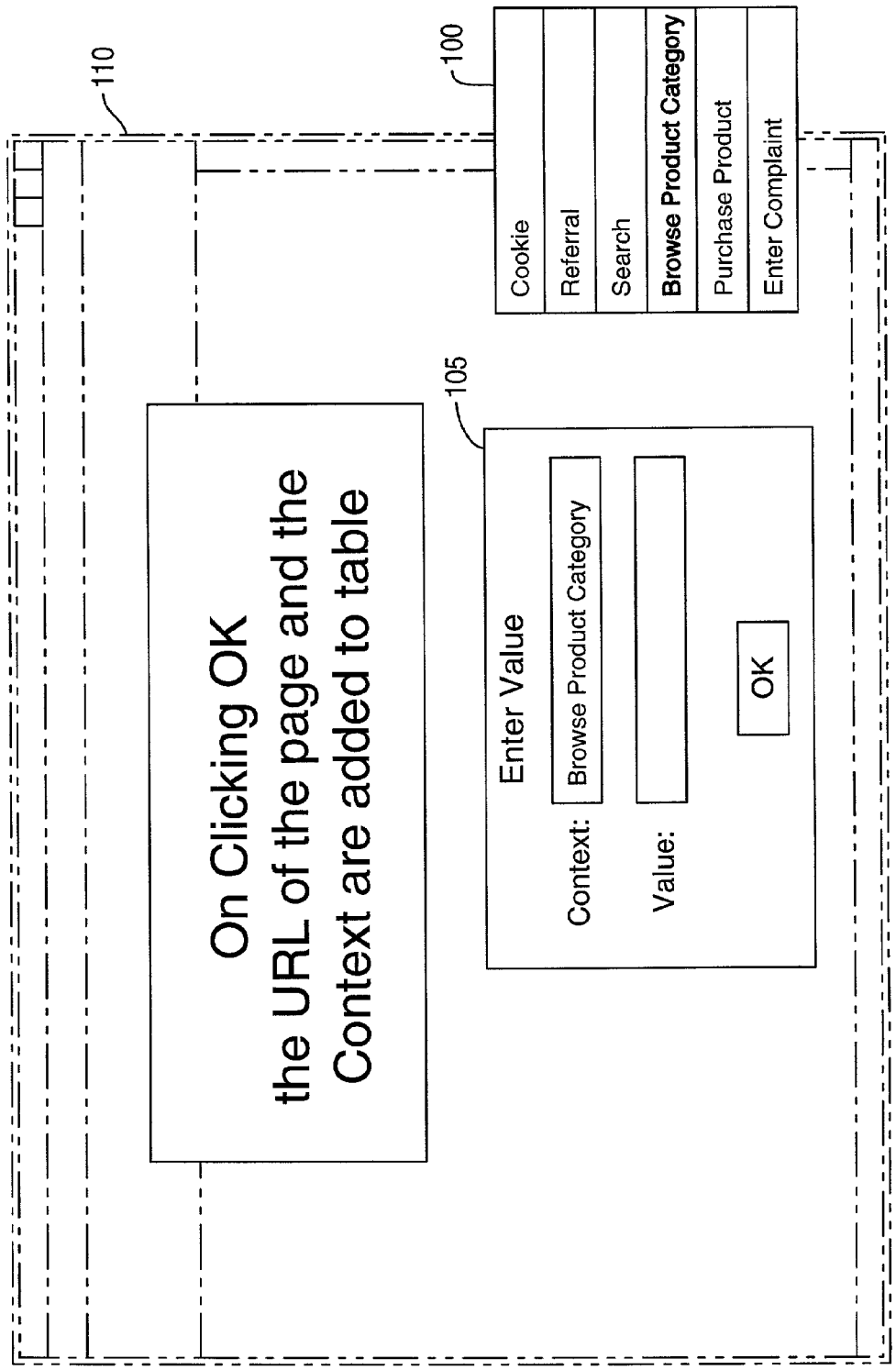
FIG. 7 depicts an illustrative graphical user interface of one embodiment of the present invention.

Once the business contexts are defined, the context mapping process can begin. An illustrative example is depicted in FIG. 7. The business analyst tool allows the analyst to browse the entire corporation website just as though he is the consumer using a graphical user interface 110. By evaluation of the content and purpose of the individual web page, as well as anticipating potential consumer actions, the analyst can determine if any of the important business context should be associated with that page. The analyst selects the appropriate business context from a selection list 100. If the value type of the context is a variable value, the analyst will be prompted to enter the value 105 to be associated with the context. If while viewing the page the analyst identifies the need to define a new business context, the context definition functions are also available to do so. Upon completion of selection of the context and entering in required value information, the analyst is offered the opportunity to establish a mapping for the page. As the mapping is executed, the URL for the page, the context GUID and the entered value (if any) are inserted into one or more of the shared configuration tables. This information will be used later to extract data for the loading function.

After the business analyst defines new business context, a data analyst may later provide a linkage to the data warehouse that will be used in the loading process. The data analyst tool may be a browser based graphical user interface that allows the analyst to view the business context definitions from the shared configuration tables, the data warehouse data model and the data warehouse metadata. An analysis of the business context definitions against the structure and semantics of the data warehouse will enable the data analyst to map a particular warehouse database, table and column to each business context. Any minor transformation may also be defined to the loading system at the same time. The object of the data analysis tool is to make it easy for the data analyst to pre-configure the "near-time" loading information that will be used by the loader. The tool will only be used as the business analyst adds new context, or significant changes are made within the data warehouse itself. In one embodiment of the present invention, the data analyst is analyzing the context information defined by the business analyst, the logical (and physical) data models for the data warehouse, and the metadata associated with the data warehouse. The data analyst constructs the configuration/mapping information that will be used by the loader to receive information from the context logging server, map it to the appropriate table(s) in the data warehouse, and use the 'real-time' loading tools available to insert new rows into those tables.

Figure 8:
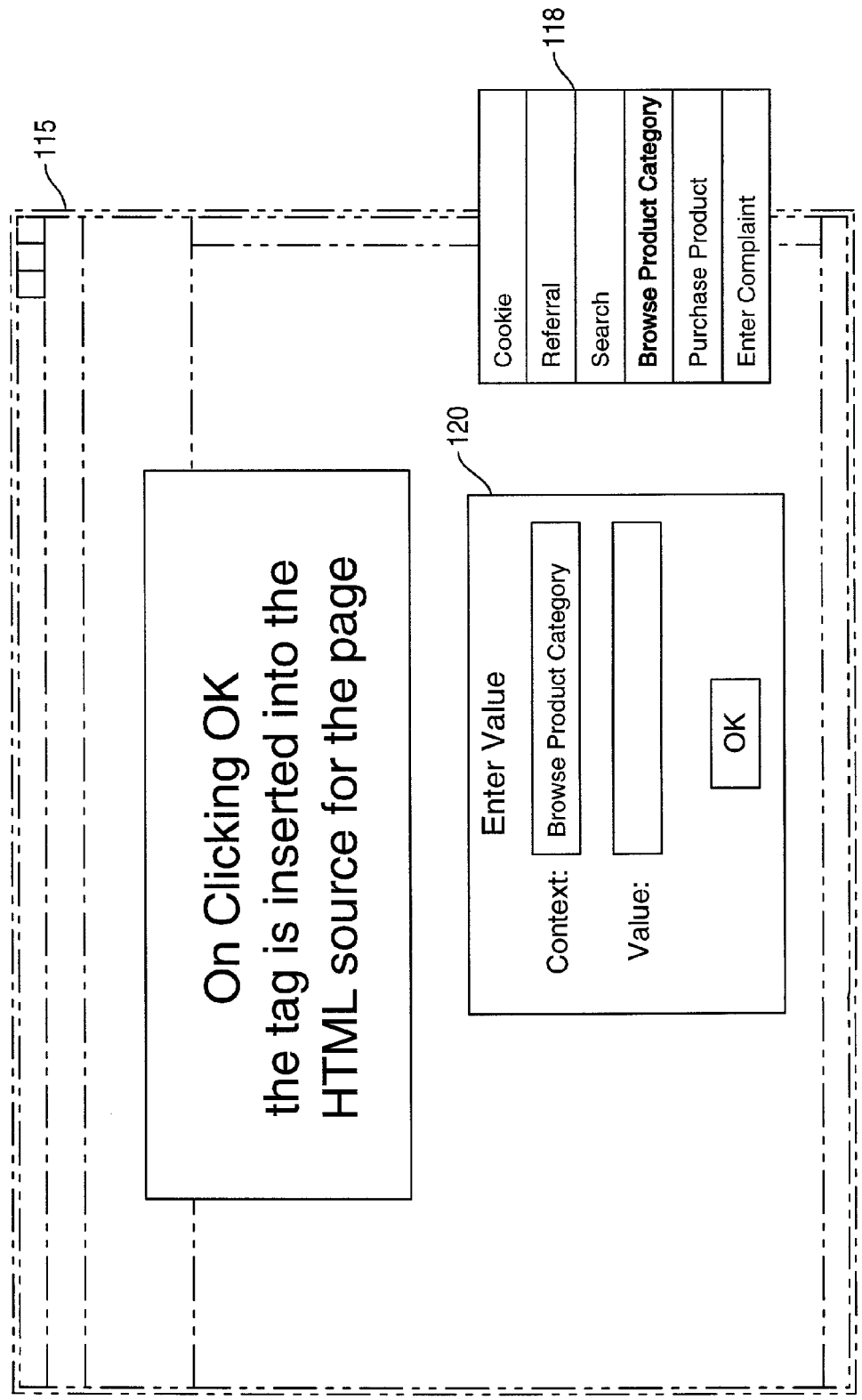
FIG. 8 depicts an illustrative graphical user interface of another embodiment.

Another illustrative embodiment of the invention, depicted in FIG. 8, is the business context tagging system. The business analyst tool allows the analyst to browse the entire corporate website, just as though they are a consumer using a graphical user interface 115. By evaluation of the content and purpose of the individual web page, as well as anticipating potential consumer actions, the analyst can determine if any of the important business context should be associated with that page. The analyst selects the appropriate business context from a selection list 118. If the value type of the context is a variable value, the analyst will be prompted to enter a value 120 to be associated with the context. If while viewing the page, the analyst identifies the need to define a new business context, the context definition functions are available to do so. Upon completion of the selection of the context and entering in the required value information, the analyst is offered the opportunity to enter the tag into the page. There are a number of possibilities for tagging methodology. One example is frequently referred to as a "ping" but other tagging methodologies are possible and known to one skilled in the art. The most likely alternative to pings would be to introduce a script tag for a "server-side script" to be executed on the context logging server. If pings are used to pass information for logging, the context logging server must itself be a HTTP server. The web server will render the IMG tag resulting in a HTTP request being sent to the logging server identified in the SRC parameter. The logging server returns a null image and extracts information from the type and value fields within the HTTP request. Combining that information with other information from the shared configuration tables, the logging server places data into the structured context data source.

Another embodiment of the present invention comprises a computer readable medium. The computer-readable medium contains instructions for controlling a computer system for capturing a business context of a user's interaction with a website. The executable instructions comprise the steps of: browsing a website to identify web pages of interest; selecting desired web pages of interest; obtaining the URL address of the desired web page; associating the desired web page URL address with a business context stored in a shared configuration table; creating proper structure in a data warehouse; extracting data from a web log corresponding to the desired web page URL address; and copying the extracted data to the data warehouse.

Having shown and described the preferred embodiments of the present invention, further adaptations of the system for capturing a business context of a user's interaction with a website as described herein can be accomplished by appropriate modifications by one of ordinary skill in the art without departing from the scope of the invention. Several of these potential modifications and alternatives have been mentioned, and others will be apparent to those skilled in the art. For example, while illustrative embodiments of this system have been discussed for illustrative purposes, it should be understood that the elements described will be constantly updated and improved by technological advances. Accordingly, the scope of the present invention should be considered in terms of the following claims and is to be understood not be limited to the details and structure, operation or process steps as shown and described in the specification and drawings.

What is claimed:

1. A method for tagging a web page to capture desired business context interaction data relating to a user's interaction with a web site, the method comprising the steps:
   - connecting to a web server and browsing a web page utilizing a context tagging tool, wherein the context tagging tool comprises a user interface to identify web pages of interest for the user's interaction;
   - selecting through the context tagging tool a desired web page of interest;
   - associating the desired web page with a business context by inserting a tag into the web page, wherein the tag comprises a request to the context logging server;
   - creating proper structure in an enterprise data warehouse utilizing a data context tool, wherein the structure comprises the business context and associated attributes;
   - extracting data from a context log of a context logging server utilizing a context log filter, wherein the extracted data contains the business context attributes; and
   - copying the extracted data to the enterprise data warehouse.

2. The method of claim 1, further comprising the steps of:
   creating a business context, wherein the business context is related to the user's interaction with a web page.

3. The method of claim 2, further comprising the step of: storing one or more created business contexts in the table.

4. A system for tagging a web page to capture desired business context interaction data relating to a user's interaction with a web site, the system comprising:
   - a web server comprising web pages and a web log, wherein the web log tracks a user's request for desired web pages;
   - a context logging server, wherein the context logging server comprises tag items and a context log, wherein the context log tracks a web page's request for a tagged item;
   - a table comprising one or more business contexts, wherein the business context is related to a user's interaction with the web page, and further wherein the business context contains one or more attributes; and
   - a tag to the context logging server, wherein the tag comprises data associated with a business context.

5. A system for extracting tagged business context interaction data relating to a user's interaction with a web site, the system comprising:
   - a context logging filter in communication with a context log and a table comprising one or more business contexts, wherein the context log filter comprises executable instructions to extract data from the context log associated with the business context;
   - a data analyst creation tool in communication with the table and an enterprise data warehouse, wherein the data analyst creation tool comprises executable instructions for creating a logical data model for mapping the extracted data to the enterprise data warehouse.

6. A system for extracting a user's interaction with a web page to capture desired business context interaction data, the system comprising:
   - a web log filter in communication with a web log and a table comprising one or more business contexts, wherein the web log filter comprises executable instructions to extract data from the web log associated with an address associated with the business context; and
   - a data analyst creation tool in communication with the table and an enterprise data warehouse, wherein the data analyst creation tool comprises executable instructions for creating a logical data model for mapping the extracted data to the enterprise data warehouse.

7. A method for capturing in near time to an enterprise data warehouse a user's interaction with a web page, comprising the steps of:
   - creating one or more business context related to a user's interaction with a web page, wherein the business contexts contain one or more attributes;
   - storing the created business context in a table;
   - browsing a website utilizing a user interface to identify web pages of interest for user's interaction;
   - selecting through the user interface a desired web page of interest;
   - modifying the desired web page with a business context tag, wherein the business context tag comprises a referrer to a context logging server;
   - creating structure in a data warehouse for business context;
   - creating a web log on the context logging server when the referrer is received by the context logging server;
   - copying one or more business context data attributes from the content logging server web log to the data warehouse.

* * * * *